United States Patent [19]

Courcoux et al.

[11] Patent Number: 4,646,556
[45] Date of Patent: Mar. 3, 1987

[54] PROCESS AND APPARATUS FOR TESTING A PILOT-OPERATED SAFETY VALVE

[75] Inventors: Alain Courcoux, Charly; Jacques Merlin, Grelieu la Varenne, both of France

[73] Assignee: Framatome & Cie., Courbevoie, France

[21] Appl. No.: 754,109

[22] Filed: Jul. 12, 1985

[30] Foreign Application Priority Data

Jul. 13, 1984 [FR] France ................ 84 11138

[51] Int. Cl.⁴ .................................. G01M 19/00
[52] U.S. Cl. ................................ 73/4 R; 73/168
[58] Field of Search .......................... 73/4 R, 168

[56] References Cited

U.S. PATENT DOCUMENTS

| | | | |
|---|---|---|---|
| 2,227,961 | 1/1941 | Caughey | 73/4 R |
| 2,419,293 | 4/1977 | Simonson | 73/4 R |
| 4,002,065 | 1/1977 | Lardi et al. | 73/4 R X |
| 4,255,967 | 3/1981 | Grymonprez et al. | 73/4 R X |
| 4,349,885 | 9/1982 | Thompson | 364/558 |
| 4,428,233 | 1/1984 | Trevisan | 73/4 R |
| 4,566,310 | 1/1986 | Cohen et al. | 73/168 X |

FOREIGN PATENT DOCUMENTS 2062812  5/1981  United Kingdom ............ 73/4 R

Primary Examiner—Stewart J. Levy
Assistant Examiner—Tom Noland
Attorney, Agent, or Firm—Pollock, Vande Sande & Priddy

[57] ABSTRACT

Process and apparatus for testing a pilot-operated safety valve, applicable to (1) a safety valve composed of a body having an inlet branch connected to a pressurized fluid container, and an outlet branch, of a valve head cooperating with a seat for controlling fluid flow between these branches, of a control actuator consisting of a piston connected to the valve head and sliding in a cylinder, forming two chambers, the operative one of which is fed with fluid, and (2) a pilot apparatus controlling the valve and comprising a pressure detection actuator whose piston is subjected to the pressure of the fluid and to the action of a spring acting against the force developed by the pressure, and a hydraulic mechanism with two cocks whose closing contact portions (311, 321) are displaced via an operating rod carrying a disc displaced by the piston, and one of which controls the fluid pressure in the control actuator and the pressure detection actuator, while the other controls the discharge of the control actuator. A constant tractive force is applied to the operating rod of the cocks to displace it against the action of the spring, the force on the rod and the displacement of the latter are measured, the force threshold corresponding to the closure of one of the cocks is determined, and the curves of displacement and force plotted against time are recorded.

4 Claims, 1 Drawing Figure

U.S. Patent    Mar. 3, 1987    4,646,556
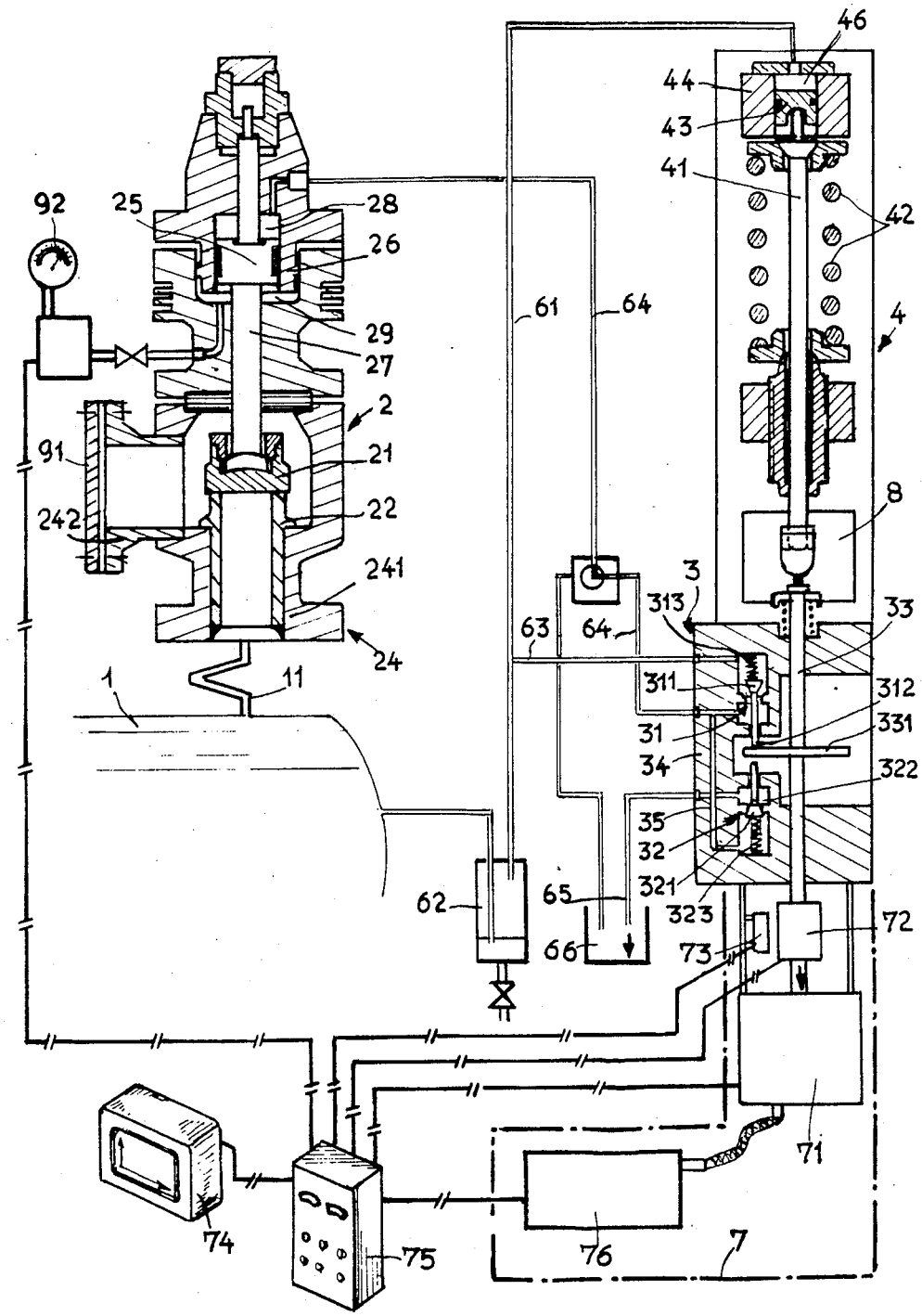

PROCESS AND APPARATUS FOR TESTING A PILOT-OPERATED SAFETY VALVE

FIELD OF THE INVENTION

The present invention relates to a process and an apparatus for testing a pilot-operated safety valve used for limiting the pressure of a fluid in a circuit or container, particularly in a nuclear reactor water circuit.

BACKGROUND OF THE INVENTION

In certain circuits conducting a pressurised fluid, safety valves are installed in order to limit the pressure of the fluid to a predetermined value. In a body provided with a cavity adapted to conduct the fluid between an inlet aperture and an outlet aperture, a safety valve contains a valve head cooperating with a seat for the purpose of opening or closing the cavity. The valve head is normally applied against the seat.

Use is made of calibrated valves in which the valve head is applied against the seat through the action of a calibrated spring. Use is also made of pilot-operated valves in which the movement of the valve head is controlled by a pilot device.

In certain circuits, such as the radioactive water circuits of nuclear reactors, it is desired to achieve great operating safety of safety valves.

Regular testing of the safety valves used is necessary, and for this purpose use is made of test benches. For example, FR No. 2.524.603 describes a test bench on which the valve is mounted and which comprises on the one hand a pushing means for displacing the valve head against the action of the calibrated spring, and on the other hand a valve head displacement transducer and a transducer measuring the force applied to the valve head, the signals supplied by these transducers being transmitted to a recorder. For different speeds it is thus possible to obtain curves indicating the response of the calibrated spring.

SUMMARY OF THE INVENTION

The present invention seeks to provide a process and an apparatus for testing a pilot-operated valve, which makes it possible to test the valve and its pilot means without pressurizing the container being protected, and without dismantling and discharging the fluid from the container. During the test, the container protected by the valve remains under pressure, but at a pressure lower than operating pressure.

The process and the apparatus according to the invention are applicable on the one hand to a safety valve composed of a body provided with an inlet branch connected to a pressurized fluid container and with an outlet branch, of a valve head cooperating with a seat for controlling the flow of fluid between the two branches, of a control actuator consisting of a piston connected to the valve head and sliding in a cylinder, thus forming two chambers, of which one, the operative chamber, is fed with fluid, and on the other hand to a pilot apparatus controlling the valve and comprising a pressure detection actuator whose piston is subjected to the pressure of the fluid and to the action of a calibrating spring acting against the force developed by said pressure, and a hydraulic mechanism provided with two cocks whose closure means are displaced with the aid of an operating rod carrying a disc displaced by the piston, and one of which controls the fluid pressure in the control actuator, while the other controls the discharge of the control actuator.

The process comprises a first stage consisting in applying a constant tractive force to the cock operating rod in order to move it against the action of the spring, measuring the force on the rod and the displacement of the latter, determining the force threshold corresponding to the closure of one of the cocks, and recording the curves of displacement and force plotted against time, and a second stage consisting in closing the outlet branch of the valve and placing under a pressure lower than the operating pressure of the container and thus the detection actuator, while at the same time applying a constant tractive force corresponding to the force threshold previously determined to the rod and measuring the negative pressure in the chamber on the same side as the rod of the control actuator for the valve head when the opposite chamber of the control actuator is discharged as a result of the cock being actuated.

The apparatus according to the invention comprises an actuator adapted to be mounted on the pilot device in order to apply a force to the hydraulic mechanism operating rod against the action of the calibration spring, a transducer measuring the force applied to the rod by the actuator, a transducer measuring the displacement of the operating rod, and means for recording the signals supplied by the transducers and closure means for the outlet branch and a pressure measuring device mounted on the valve for the purpose of measuring the pressure in the inoperative chamber situated on the valve head control rod side.

According to another characteristic, the apparatus comprises a yoke connecting the operating rod and a control rod displaced by the piston of the pressure detection actuator.

BRIEF DESCRIPTION OF THE DRAWING

The invention will now be described in greater detail with reference to one embodiment given by way of example and illustrated in the accompanying drawing.

The single FIGURE is a general diagram showing the pilot-operated valve and the test apparatus.

DETAILED DESCRIPTION

The process and apparatus according to the invention are applicable to a safety valve 2 which limits the pressure of a fluid conducted by or contained in a circuit or container 1.

The valve comprises a lower body 24, which has an inlet branch 241 and an outlet branch 242 forming respectively the inlet aperture and outlet aperture. The inlet branch is connected by a pipe 11 to the container 1. The cavity formed by the body houses a valve head 21 cooperating with a seat 22 in order to control the flow of fluid from the inlet aperture to the outlet aperture. During normal operation the valve head 21 is applied against the seat 22 and is then subjected to the pressure of the fluid arriving in the inlet aperture.

The valve includes a valve head control means which is of the actuator type and is accommodated in the upper body 26. This control means consists of a piston 25 which is connected to the valve head 21 by a rod 27 and which slides sealingly in a cylinder formed in the upper body 26. The rod 27 slides sealingly in the valve body. The piston 25 and its cylinder 26 form an operative chamber 28 on the end side and an inoperative chamber 29 on the rod side. The application of pressure to the chamber 28 on the end side tends to apply the valve head 21 against its seat 22.

The safety valve is associated with a pilot device comprising a pressure detection device 4 and a hydraulic mechanism 3.

The pressure detection device 4 consists of an actuator whose piston 43 slides in a cylinder 44 and displaces a control rod 41. The assembly comprising the piston 43 and rod 41 is displaced by the action of the pressure of the fluid feeding the chamber 46 on the end side and of a calibration spring 42 which acts against the force due to the pressure of the fluid.

The hydraulic mechanism 3 comprises two cocks 31 and 32 housed in a body 34. These cocks are composed of closure means 311 and 321 fastened to rods 312 and 322 serving for guidance and control and also subjected to the action of calibrated springs 313 and 323. The rods of the closure means are disposed coaxially and in opposition, and their ends project into a cavity in body 34. The rods of the closure means can be displaced by means of an operating rod 33 carrying a disc 331 extending between the ends of the rods 312 and 322. The rod slides in the body in such a manner that its displacement in one direction, from the neutral position, opens one of the cocks and closes the other, and vice versa.

The control rod 41 and the operating rod 33 are coaxial and bear against one another at their ends, the rod 33 being pushed back by a spring.

The chamber 46 is connected to the container 1 by a pipe 61, with a relay tank 62. The cock 31 is connected by a pipe 63 to the pipe 61 and by a pipe 64 to the chamber 28. The cock 32 is connected by a pipe 35 and the pipe 64 to the inoperative chamber 28 and by a pipe 65 to the discharge tank 66.

The operation of the pilot-operated valve is as follows: As long as the pressure in the container 1 does not exceed a predetermined value, the piston 43, the control rod 41 and the operating rod 33 are in the raised position and the cock 31 remains open. The pressurized fluid then acts on the piston 25 to close the passage between the valve head 21 and the seat 22. Because the cock 32 is then closed, there can be no leakage to the discharge. When the pressure in the container 1 rises, the cock 31 is closed and the cock 32 is opened. Consequently, the chamber 28 is connected to the discharge, and through the action of the pressure the valve head 21 is lifted. Because the cock 31 is closed, the chamber 46 remains under pressure. Through the action of a fall in pressure in the container 1, the piston 43, the rod 41 and the rod 33 rise again, thereby bringing about the closing of the cock 32 and the opening of the cock 31.

The apparatus comprises a test bench 7 provided with an actuator 71 whose rod can be coupled to the rod 33. This actuator is intended to apply a force to the rod 33 against the action of the calibrating spring 42. The bench also includes a transducer 72 measuring the force applied to the rod 33 by the actuator, and a transducer 73 measuring the displacement of the rod 33. It is also provided with means 74 (plotting table or screen) for recording the signals supplied by the transducers 72 and 73. Electrical equipment 75 and electrohydraulic equipment 76 complete the test bench. The force measuring transducer 72 is mounted between the rod 33 and the actuator rod. An integrated force limiting yoke 8 makes the connection between the rod 41 and the rod 33 in such a manner as to enable the rod 41 to be pulled by the actuator 71.

The apparatus is completed by a stopper 91 which makes it possible to close off the outlet branch 242 of the valve, and by an absolute pressure gauge 92 (vacuum gauge), which is connected to the inoperative chamber 29 situated on the valve head control rod side.

The process according to the invention is as follows:

The circuit of the container 1 is first depressurized, the valve 2 and its pilot device remaining in position. The control rod 41 and the operating rod 33 are fastened together by means of the yoke 8. The test bench is placed in position, the actuator rod being coupled to the operating rod 33.

With the aid of the actuator 71 a progressive tractive force is applied to the rod 33 in order to displace it against the action of the calibrated spring 42. The assembly comprising the rod 41 and the rod 33 is displaced downwards, compressing the calibrated spring 42. With the aid of the transducer 72 the force applied to the calibrated spring is measured, and the displacement of the rod 33, the rod 41 and the spring 42 are measured.

The force applied is progressive, so that through the displacement of the rod 33 the cock 31 is closed and then the cock 32 is opened. The curve of the displacement and the curve of the force throughout movement of the rod 33, plotted against time, are recorded.

It is then possible to ascertain the force threshold corresponding to the closing of the cock 31 and to record the two curves indicating the stiffness of the calibrating spring 42.

The outlet branch 242 is then closed off with the aid of the stopper 91, and the absolute pressure gauge 92 is connected to the chamber 29.

With the aid of the actuator 71, a force is applied to the rod 33 at a level corresponding to the pressure, bringing about the closing of the cock 31 (which was measured previously).

The container 1 is placed under a pressure lower that the operating pressure (about 10 bars). The thrust force due to the pressure of the fluid on the piston 43 is added to the constant force applied by the actuator 71. The latter continues to exert a constant force during the downward movement of the assembly comprising the rod 41 and the rod 33, until the cock 32 is opened.

The opening of the cock 32 brings the chamber 28 of the valve control actuator—until then supplied under pressure from the container 1—into communication with the discharge. This communication with the discharge brings about the rising of the valve head 21. As the outlet aperture is closed off by the stopper 91, the valve head 21 still receives an upward force equal to the product of the section of the rod 27 by the pressure of the fluid contained in the container 1, whereas the hydraulic chamber 28 is emptied to the discharge. The gauge 92 then records a progressive negative pressure. The pressure in the container 1 is much lower than the normal operating pressure of the container, and is determined in dependence on the cross-sections of the rod 27 and the chamber 46.

The negative pressure value obtained indicates the displacement of the valve head in the opening direction. The displacement of the valve head 21 on opening without discharge of the valve (which is closed off) is thus controlled by the combined action of the pressure of the fluid from the container 1 and the constant force of the actuator 71.

We claim:

1. Process for testing on the one hand, a safety valve (2) composed of a body (24) provided with an inlet branch (241) connected to a container (1) containing a fluid and with an outlet branch (242), of a valve head (21) cooperating with a seat (22) for controlling the flow of fluid between said branches (241, 242), of a control actuator consisting of a piston (25) connected to the valve head (21) and sliding in a cylinder (26), thus forming two chambers (28, 29), of which one, the operative chamber, is fed with said fluid, and on the other hand a pilot apparatus (3, 4) controlling the valve and comprising a pressure detection actuator (43, 44) whose piston (43) is subjected to the pressure of the fluid from the container and to the action of a calibrating spring (42) acting against the force due to said pressure, and a hydraulic mechanism (3) provided with two cocks (31 and 32) whose closure means (311, 321) are displaced with the aid of an operating rod (33) carrying a disc displaced by said piston (43), and one of which (31) controls the fluid pressure in the control actuator (25, 26), while the other (32) controls the discharge of the control actuator (25, 26), said process comprising:

a first stage consisting in applying a progressive tractive force to the operating rod (33) in order to move it against the action of the calibrated spring (42), measuring the force applied to the rod and the displacement of the latter, determining the force threshold corresponding to the closure of one of the cocks, and recording the curves of displacement and force plotted against time; and a second stage consisting in closing the outlet branch (242) of the valve (2) and placing under a pressure lower than the operating pressure of the container (1) and thus the detection actuator (43, 44), while at the same time applying a constant tractive force corresponding to the force threshold previously determined to the rod (33), and measuring the negative pressure in the chamber (29) on the same side as the rod of the control actuator (25, 26) for the valve head (21), when the opposite chamber (28) of the control actuator is discharged as a result of the cock (32) being actuated.

2. An apparatus for testing, on the one hand, a safety valve (2) composed of a body (24) provided with an inlet branch (241) connected to a container (1) containing a fluid and with an outlet branch (242), of a valve head (21) cooperating with a seat (22) for controlling the flow of fluid between said branches (241, 242), of a control actuator consisting of a piston (25) connected to the valve head (21) and sliding in a cylinder (26), thus forming two chambers (28, 29) of which one, the operative chamber, is fed with fluid, and on the other hand a pilot apparatus (3–4) controlling the valve (2) and comprising a pressure detection actuator (43, 44) whose piston (43) is subjected to the pressure of the fluid and to the action of a calibrating spring (42) acting against the force due to said pressure, and a hydraulic mechanism (3) provided with two cocks (31 and 32) whose closure means (311, 321) are displaced with the aid of an operating rod (33) displaced by said piston (43), and one of which controls the fluid pressure in the control actuator (25, 26), while the other controls the discharge of the control actuator (25, 26), comprising an actuator (71) adapted to be mounted on the pilot device in order to apply a tractive force to the operating rod (33) of the hydraulic mechanism (3) against the action of the calibrated spring (42), a transducer (72) measuring the force applied to the rod by the actuator (71), a transducer (73) measuring the displacement of the rod (33), means (74) for recording the signals supplied by said transducers (72, 73), closure means (91) for the outlet branch (242) and a pressure measuring device mounted on the valve for the purpose of measuring the pressure in the inoperative chamber (29) situated on the same side as the control rod of the valve head (21).

3. Apparatus according to claim 2, comprising a yoke (8) connecting the operating rod (33) and a control rod (41) displaced by the piston (43) of the pressure detection actuator.

4. Apparatus according to claim 3, wherein the yoke (8) is provided with a force limiter.

* * * * *